(12) United States Patent
Lindsay et al.

(10) Patent No.: US 6,343,288 B1
(45) Date of Patent: *Jan. 29, 2002

(54) SINGLE PASS SPACE EFFICIENT SYSTEM AND METHOD FOR GENERATING AN APPROXIMATE QUANTILE IN A DATA SET HAVING AN UNKNOWN SIZE

(75) Inventors: Bruce Gilbert Lindsay, San Jose; Gurmeet Singh Manku, Santa Clara; Sridhar Rajagopalan, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/268,089

(22) Filed: Mar. 12, 1999

(51) Int. Cl.[7] .............................................. G06F 17/30

(52) U.S. Cl. .................... 707/7; 707/2; 707/6; 707/101

(58) Field of Search ............................. 707/2, 6, 7, 101

(56) References Cited

U.S. PATENT DOCUMENTS

| | | | |
|---|---|---|---|
| 4,379,948 A | 4/1983 | Ney et al. .................... 704/203 |
| 4,530,076 A | 7/1985 | Dwyer ........................ 367/135 |
| 4,817,158 A | 3/1989 | Picheny ...................... 704/224 |
| 4,829,427 A | 5/1989 | Green .......................... 707/4 |
| 5,018,088 A | 5/1991 | Higble ........................ 702/194 |
| 5,091,967 A | 2/1992 | Ohsawa ....................... 382/172 |
| 5,105,469 A | 4/1992 | MacDonald et al. ........ 382/162 |
| 5,345,585 A | 9/1994 | Iyer et al. ...................... 707/2 |
| 5,379,419 A | 1/1995 | Hefferman et al. ............ 707/4 |
| 5,664,171 A | 9/1997 | Agrawal et al. ............ 502/120 |
| 5,864,841 A * | 1/1999 | Agrawal et al. ............... 707/2 |
| 6,108,658 A * | 8/2000 | Lindsay et al. ............. 707/101 |
| 6,195,657 B1 * | 2/2001 | Rucker et al. ................. 707/5 |

OTHER PUBLICATIONS

Fu, et al. (IEEE publication, 2001) paper entitled "Novel algorithms for computing medians and other quantiles of dis–resident data" in Database Engineering and Application, 2001 International Symposium, pp. 145–154.*

Publication: "A One–Pass Space–Efficient Algorithm for Finding Quantiles". Agrawal et al. Proceedings of the 7th International Conference on Management of Data (COMAD–95). India. 1995.

Publication: "A One–Pass Algorithm for Accurately Estimating Quantiles for Disk–Resident Data." Alsabti et al. pp. 346–355. Proceedings of the 23rd VLDB Conference. Athens, Greece, 1997.

(List continued on next page.)

Primary Examiner—Diane D. Mizrahi
(74) Attorney, Agent, or Firm—John L. Rogitz (57) ABSTRACT

A space-efficient system and method for generating an approximate $\phi$-quantile data element of a data set in a single pass over the data set, without a priori knowledge of the size of the data set. The approximate $\phi$-quantile is guaranteed to lie within a user-specified approximation error $\epsilon$ of the true quantile being sought with a probability of at least $1-\delta$, with $\delta$ being a user-defined probability of failure. B buffers, each having a capacity of k elements, initially are filled with elements from the data set, with the values of b and k depending on approximation error $\epsilon$ and the probability $\delta$. The buffers are then collapsed into an output buffer, with the remaining buffers then being refilled with elements, collapsed (along with the previous output buffer), and so on until the entire data set has been processed and a single output remains. The element of the output corresponding to the approximate quantile is then output as the approximate quantile. In later iterations (when the height of the tree is at least equal to a predetermined height that depends on $\delta$ and $\epsilon$), the data is sampled non-uniformly to populate the buffers to render the desired performance. Parallel processors can be used, with the final output buffers of the processors being sent to a collecting processor $P_0$ as input buffers to the collecting processor $P_0$.

48 Claims, 9 Drawing Sheets

OTHER PUBLICATIONS

Publication: "Efficient Sampling Strategies for Relational Database Operations." Lipton et al. pp. 195–226. Theoretical Computer Science. vol. 116. 1993.

Publication: "A Minimum Storage Algorithm for Computing the Median." Pohl. IBM Research Center, Combinatorial Mathematics. Nov. 1969.

Book: "An Introduction to Probability Theory and its Applications". Feller. Princeton Univ. vol. 1, Third Edition. pp. 212–242. 1968.

Publication: "The $P^2$ Algorithm for Dynamic Calculation of Quantiles and Histograms Without Storing Observations." Jain et al. Communications of the ACM. vol. 28, No. 10. pp. 1076–1085. Oct. 1985.

Publication: "Mining Association Rules Between Sets of Items in Large Databases" Agrawal et al. pp. 207–216. ACM 1993.

Publication: "Equidepth Partitioning of a Data Set Based on Finding its Medians." Gurajada et al. pp. 92–101. IEEE. 1991.

Publication: "Quantile Estimation From Grouped Data: The Cell Midpoint." B. W. Schmeiser et al. pp. 221–234. Communications in Statistics: Simulation and Computation. pp. 221–234. 1977.

Publication: "The Generation of Order Statistics in Digital Computer Simulation: A Survey." B.W. Schmeiser: Proceedings of The Winter Simulation Conference. pp. 137–140. 1978.

Publication: "Equi–Depth Histograms For Estimating Selectivity Factors For Multi–Dimensional Queries." Muralikrishna et al. pp. 28–36. ACM SIGMOD. 1988.

Publication: "Accurate Estimation of the Number of Tuples Satisfying a Condition." Piatetsky–Shapiro et al. pp. 256–275. SIGMOD. Proceedings of Annual Meeting. Boston, MA. 1984.

Book: "Selection and Sorting with Limited Storage". Munro et al. Theoretical Computer Science, vol. 12. pp. 315–323. 1980.

Publication: "A Theory of the Learnable." L.G. Valiant. Communication of the ACM. vol. 27, No. 11. pp. 1134–1142. Nov. 1984.

Publication: "Improved Histograms for Selectivity Estimation of Range Predicates." Poosala et al. SIGMOD. pp. 294–305. Montreal, Canada. 1996.

Publication: "Selecting the Median." Dor et al. Proceedings of the 6th Annual ACM–SIAM Symposium on Discrete algorithms. Chpt. 4, pp. 28–37. San Francisco, CA. 1995.

Publication: "Parallel Sorting on a Shared–Nothing Architecture Using Probabilistic Splitting." DeWitt et al. Proceedings of the 1st International Conference on Parallel and Distributed Information Systems. pp. 280–291. Florida. Dec. 1991.

Publication: "Access Path Selection in a Relational Database Management System." Selinger et al. Proceedings of the ACM–SIGMOD International Conference on Management of Data. pp. 23–34. Boston, MA. 1979.

Publication: "Progress in Selection." Mike Paterson. Dept. Computer Science. Univ. Warwick. United Kingdom. 1977.

* cited by examiner

FIG. 1

FIG. 2
OVERALL FLOW

FIG. 3 "NEW"

FIG. 4

FIG. 5 "COLLAPSE"

FIG. 6
"OUTPUT"

FIG. 7
SELECTING BUFFERS
FOR COLLAPSE

FIG. 8
COMPUTING "r"

SINGLE PASS SPACE EFFICIENT SYSTEM AND METHOD FOR GENERATING AN APPROXIMATE QUANTILE IN A DATA SET HAVING AN UNKNOWN SIZE

RELATED APPLICATIONS

This application is related to U.S. patent application Ser. No. 09/050,434 filed Mar. 30, 1998 now U.S. Pat. No. 6,108,658 for an invention entitled "SINGLE PASS SPACE EFFICIENT SYSTEM AND METHOD FOR GENERATING AN APPROXIMATE QUANTILE IN A DATA STREAM THAT SATISFIES AN APRIORI USER-DEFINED APPROXIMATION ERROR", owned by the present assignee and incorporated herein by reference.

BACKGROUND OF THE INVENTION

1. Field of the Invention

The present invention relates generally to computer database systems, and more particularly to systems and methods for finding quantiles in a data stream.

2. Description of the Related Art

Quantiles, which are elements at specific positions in a sorted data stream or database, are of interest to both database users, designers, and implementers. One reason quantiles are of interest is that they characterize distributions of real world data sets and are less sensitive to outlying data points than are, e.g., the mean value of a data stream, or the variance of a data stream.

As but one example of when a quantile might be useful, a user might want a listing, from a personnel database, of salespeople who are taller than a certain height and who have gross sales above a certain amount. The user would request this information by means of a database query. It is the function of a database management system (dbms) to respond to the query quickly and efficiently. In responding to the query, the dbms typically must reformat the query into a more efficient equivalent query. Then, the dbms evaluates which one of several potential query execution plans would be the most computationally efficient in executing the equivalent query. Because the difference in computational time between an efficient query execution plan and an inefficient plan can be great, it is worthwhile for the dbms to undertake the above-mentioned evaluation.

This is where a knowledge of quantiles in the database can be useful. It happens that in evaluating the efficiency of query execution plans, a dbms relies on statistics that relate to the requested data, and one important statistic is quantiles. To illustrate, suppose in the above example that the amount of gross sales of interest is $500,000, and suppose further that the database contains 100,000 personnel records. If $500,000 is at the 80% quantile of gross sales, the dbms can be assured that at most its response to the query will have 20,000 records, which statistical information is important for generating and evaluating good query plans.

In addition to the above application of quantiles, the ability to determine quantiles has many other applications in the database field. Two such additional applications are database partitioning during parallel processing, and database mining. Thus, the skilled artisan will appreciate that determining quantiles is an important task for many if not most dbms.

Like many other computer tasks, the determination of quantiles must satisfy several practical considerations. Specifically, quantiles should be generated while minimizing the amount of memory space consumed, optimizing computational efficiency, and still producing an exact or at least highly accurate approximate quantile.

First, for computational efficiency it is desirable that the determination of quantiles not require excessive passes over a data stream to sort the data stream. Indeed, requiring only a single pass over a data stream is highly desirable from a computational efficiency viewpoint. Processing data in only a single pass, however, is somewhat challenging in part because no assumptions or guarantees can be made regarding the order of arrival of elements in a data stream or their value distributions. Nevertheless, it is desirable that quantiles be generated in only a single pass without depending on assumptions about the data stream for efficiency or correctness.

Additionally, as stated above the amount of memory required to find quantiles should be minimized. Thus, although one computationally efficient way to find quantiles of a data stream would be to buffer the entire stream in memory and then process the stream, this would require excessive memory and accordingly is not very desirable. Instead, as recognized by the present invention it is desirable to conserve memory, while still promoting computational efficiency.

As also recognized by the present invention, to conserve memory space and at the same time promote computational efficiency, approximate quantiles can be substituted for exact quantiles, depending, of course, on the particular application. For this reason, the present invention recognizes that the accuracy of an algorithm that finds approximate quantiles should be tunable to the level of accuracy required for the application, with its performance degrading gracefully if at all when the accuracy requirements are increased.

In the above-referenced patent application, a method for generating approximate quantiles is disclosed that, unlike the method of Munro et al., in an article entitled "Selection and Sorting with Limited Storage" published in *Theoretical Computer Science*, 12:315–323 (1980), advantageously does not require more than one pass over the data stream and further, unlike the method disclosed in Agrawal et al., in an article entitled "A One-Pass Space-Efficient Algorithm for Finding Quantiles" published in *Proc. 7th Int'l Conf. Management of Data* (1995), advantageously guarantees a bound on the approximation error. The method of the above-referenced patent application does, however, require that the size "N" of the input stream be known a priori.

As recognized by the present invention, in practice the size "N" of the input stream in fact might not be known at the outset. As an example, the input stream might be an intermediate table, the size of which might only be crudely estimated, if at all, prior to quantile computation. When the estimate for "N" is bad, the quantile-generating algorithms of previous methods might fail to provide the required approximation guarantee, or indeed might fail to complete execution altogether.

Fortunately, the present invention understands that a scalable, parallelizable, single-pass algorithm can be provided for generating approximate quantiles within predefined error bounds, even when the size "N" of the input stream is not known beforehand, while minimizing memory size requirements. As set forth more fully below, random, non-uniform sampling of the input stream can be used to achieve this result while minimizing memory space overhead.

SUMMARY OF THE INVENTION

A method is disclosed for determining at least one approximate quantile of a number of elements in a data set in a single pass over the elements while minimizing memory usage and meeting a desired approximation guarantee with a given probability without knowing the number of elements. At least some of the elements may be sampled non-uniformly, and sampled elements are used to fill input buffers. The number and size of the buffers depend at least on the approximation guarantee (and, preferably, the given probability) but not on the number of elements in the data set.

One or more approximate quantiles are output such that the approximate quantiles meet the approximation guarantee with the given probability.

More rigorously, given user-specified approximate quantile $\phi$, user-specified approximation error $\epsilon$, and user-specified probability $\delta$, the present invention computes, in a single pass over a data set of unknown size, an $\epsilon$-approximate $\phi$-quantile with a probability of 1−$\delta$. The $\phi$-quantile of a data set of size N, for $\phi \epsilon [0,1]$, is defined to be the data element at position $\lceil \phi N \rceil$ in the sorted sequence of the data set. An $\epsilon$-approximate $\phi$-quantile is defined to be any element of the data set whose position lies between the element at position $\lceil (\phi-\epsilon)N \rceil$ and the element at position $\lceil (\phi+\epsilon)N \rceil$ in the sorted sequence of the data set. As understood herein, several elements of the data set can qualify as an $\epsilon$-approximate $\phi$-quantile. The value $\delta \epsilon [0,1]$ denotes the probability that the present invention fails to report an $\epsilon$-approximate $\phi$-quantile. Typically, $\delta$ lies in the range 0.01 to 0.0001.

From another aspect, the invention is a general purpose computer programmed according to the inventive steps herein to determine a desired approximate $\phi$-quantile for elements in a data stream of unknown size, within a user-specified approximation error $\epsilon$ and with a user-specified probability of at least 1−$\delta$. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a general purpose computer and one or more input devices associated with the computer for generating a user specification. The specification establishes one or more desired approximate $\phi$-quantiles, a quantile approximation error $\epsilon$, and a probability of failure $\delta$, such that each approximate $\phi$-quantile is guaranteed to represent a true quantile of a data set and to lie within the quantile approximation error $\epsilon$ with a probability of at least 1−$\delta$. The system also includes a data set having a size that is unavailable to the computer in advance. Further, the system includes computer usable code means that are executable by the computer for determining an $\epsilon$-approximate $\phi$-quantile data element in the data set. As set forth in detail below, the computer usable code means include means for determining a number b of buffers and a size k of each buffer, and a number h, based at least in part on the permissible approximation error $\epsilon$ and the probability of failure $\delta$. Also, means are provided for sampling the data set based at least in part on the number h to establish sampled data elements for populating buffers. Moreover, means fill empty buffers with sampled data elements to establish a plurality of input buffers, and then means collapse data elements in input buffers into at least one output buffer. Means are provided for outputting, from an output buffer, at least one $\epsilon$-approximate $\phi$-quantile data element.

In one preferred embodiment, the means for sampling determines a sampling rate r based at least in part on the number h. Also, the means for collapsing can be represented by a data tree defining an integer number of levels, and the system further includes means for establishing a level integer l to be the lowest level of fall buffers in the data tree. The filling means is invoked when one or more empty buffers exist, with the level integer l being incremented by unity at least n times, $n \geq 1$, when exactly one empty buffer exists. Otherwise, the level integer l is not incremented. Each empty buffer is associated with the level integer l. Means collapse buffers at level l when no empty buffers exist, with the resulting output buffer being associated with the integer l+1.

As also disclosed below in relation to the preferred embodiment, the sampling means sets the sampling rate r equal to unity when the largest level L assigned to any buffer is less than the number h. Otherwise, the means for sampling sets the sampling rate r equal to $1/2_{L+1-h}$. Accordingly, the means for sampling samples the data set at least part of the time non-uniformly. If desired, the computer usable code means dynamically allocates the input buffers.

An output buffer is used as an input buffer for a successive collapsing operation, and the means for collapsing is invoked when all buffers contain k data elements. In a particularly preferred embodiment, the means for collapsing includes means for sorting data in at least some input buffers $X_1, \ldots X_c$, with each input buffer defining a respective weight $w_i$ that is representative of the number of data elements represented by each element of the input buffer. Selecting means sort data elements from the input buffers for merging, and then means repeatedly increment a counter $w_i$ times in response to the means for selecting. Furthermore, an element from an $i^{th}$ input buffer is designated as an output buffer element when the counter is at least as large as a predetermined value. Means collect elements designated as output buffer elements into an output buffer, and then designate the input buffers as empty and the output buffer as a full input buffer for then reinvoking the means for filling to fill with data elements input buffers designated as empty, and the full output buffer is usable as an input buffer by the means for collapsing.

In addition to the above, the means for determining b, k, and h minimizes the product b*k subject to at least one constraint. Preferably, the constraint is a function at least of the permissible approximation error $\epsilon$ and the probability of failure $\delta$. In one implementation, the computer usable code means is implemented in a database management system.

In another aspect, for an input data set having at least one true $\phi$-quantile data element, a computer-implemented method is disclosed for generating, in a single pass over the input data set without knowledge of the size of the data set, one or more approximate $\phi$-quantile data elements respectively representative of the true $\phi$-quantile data elements. The approximate $\phi$-quantile data elements differ from the respective true $\phi$-quantile data elements by no more than a user-defined approximation error $\epsilon$ with a probability of 1—(a user defined probability of failure $\delta$). The method includes establishing b buffers, each having a capacity to hold k data elements. B and k are integers that are related to the approximation error $\epsilon$ and the probability of failure $\delta$. The method also includes alternately filling empty buffers with elements from the data set to establish input buffers and then storing only a subset of the elements in the input buffers into one or more output buffers until the entire input data set is processed, with at least one of the elements being output as the approximate $\phi$-quantile.

In still another aspect, a computer program device includes a computer program storage device that is readable by a digital processing apparatus, and a program on the program storage device that includes instructions which are executable by the digital processing apparatus for determining at least one desired approximate φ-quantile data element for elements in a data set within at least one user defined approximation error ε with a probability of at least 1−δ. The method can be undertaken without using the size of the data set. The method that is undertaken by the program device includes filling at most b empty buffers with at most k elements in the input data set to establish at least some input buffers, with b and k being related to the approximation error ε and to a probability of failure δ and unrelated to the size of the data set. A subset of the elements in the input buffers is stored in at least one output buffer, and an element is identified in a final output based on the desired approximate φ-quantile data element.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
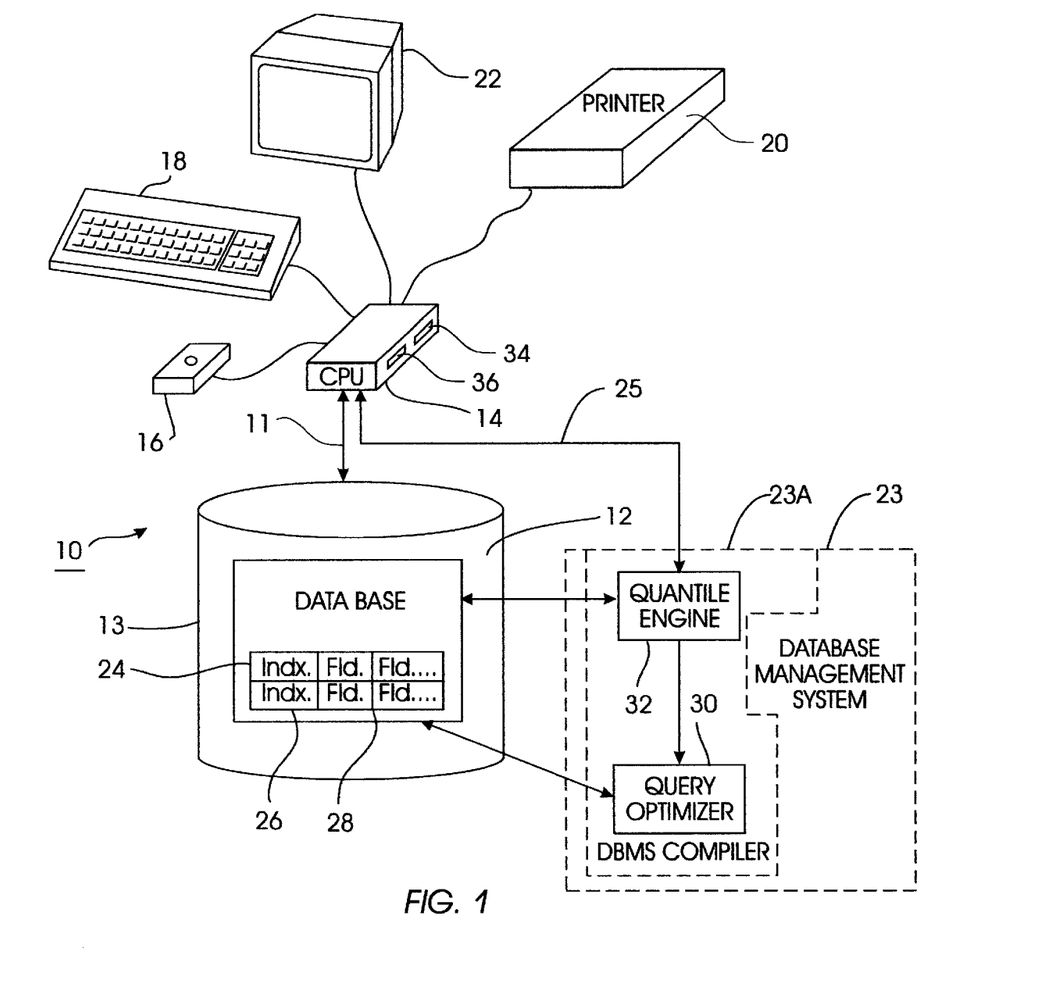
FIG. 1 is a schematic diagram showing the system of the present invention for generating approximate quantiles in a data stream.

Referring initially to FIG. 1, a system is shown, generally designated 10, for accessing, via a path 11, a data stream such as N data elements from a database 12 for gen erating approximate quantiles of the data stream, wherein N is an integer that is not necessarily known a priori. Indeed, the present invention outputs approximate quantiles without requiring knowledge of N. The data elements may reside, for example, in one or more storage devices such as the device 13. In the particular architecture shown, the system 10 includes a digital processing apparatus, such as a computer 14. In one in tended embodiment, the computer 14 may be a personal computer made by International Business Machines Corporation (IBM) of Armonk, N.Y., or the computer 14 may be any computer, including computers sold under trademark s such as AS400, with accompanying IBM Network Stations. Or , the computer 14 may be a Unix computer, or OS/2 server, or Windows NT server, or IBM RS/6000 250 workstation or an IBM laptop computer.

As shown in FIG. 1, the computer 14 is electrically connected to one or more input devices, e.g., a mouse 16 and a keyboard 18, which can be manipulated by a user of the system 10 to generate requests for data that explicitly or implicitly define one or more desired approximate φ-quantile data elements that lie within a desired user-defined approximation error ε with a user-defined probability of at least 1−δ. These quantiles can be output via an output device such as a printer 20 or monitor 22 that are conventionally coupled to the computer 14.

In one implementation of the present invention, a database management system (dbms) 23 of the compiling kind executes in the computer 14 , receiving, among other things, user requests that contain database queries. The dbms 23 processes the queries, providing access to the database 12. The dbms 23 includes a compiler 23a, which may also be referred to as a "bind" component.

FIG. 1 shows that the storage device containing the database 12 electronically stores a plurality of data records 24, commonly referred to as tuples. Each data record 24 can include an index element 26 and a plurality of field elements 28, commonly referred to as attributes. For example, each data record 24 may contain personnel information, with the fields 28 containing values for attributes of the person such as age, height, gross sales, and so on.

As disclosed previously, the present space-efficient system and method for finding approximate quantiles within user-defined error bounds has many applications. In but one illustrative use of the present invention, the user might want to retrieve information from the database 12 by generating a query, and to do so the user manipulates the mouse 16 or keyboard 18 as appropriate. Typically, a query is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the dbms compiler 23a.

During compilation, the computer 14 receives the application program and forwards the query statements over an information path 25 to a query optimizer 30 that is included in the compiler 23a for determining how to efficiently retrieve the requested data, based on the user-defined predicates. As but one example, the query optimizer can be one of the optimizers discussed by Jarke et al. in "Query Optimization in Database Systems", 16 *ACM Computing Surveys* 2 (June 1984).

As intended by the present invention, the dbms compiler 23a includes a quantile engine 32 coupled to the query optimizer 30. In accordance with the method described below, the query optimizer 30 estimates the number of records 24 satisfying the predetermined predicates based in part on quantile values that are generated by the quantile engine 32. It is to be understood that the components such as the query optimizer 30 and quantile engine 32 can be included in dbms compiler software contained in an appropriate electronic data storage that includes, e.g., a hard disk drive 34 and optical disk drive 36 conventionally coupled to the computer 14.

The flow charts herein illustrate the structure of the quantile generator of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the quantile engine 32 may be a computer program that is executed by a processor within the computer 14 as a series of computer-executable instructions. In addition to the drives 34, 36, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 2:
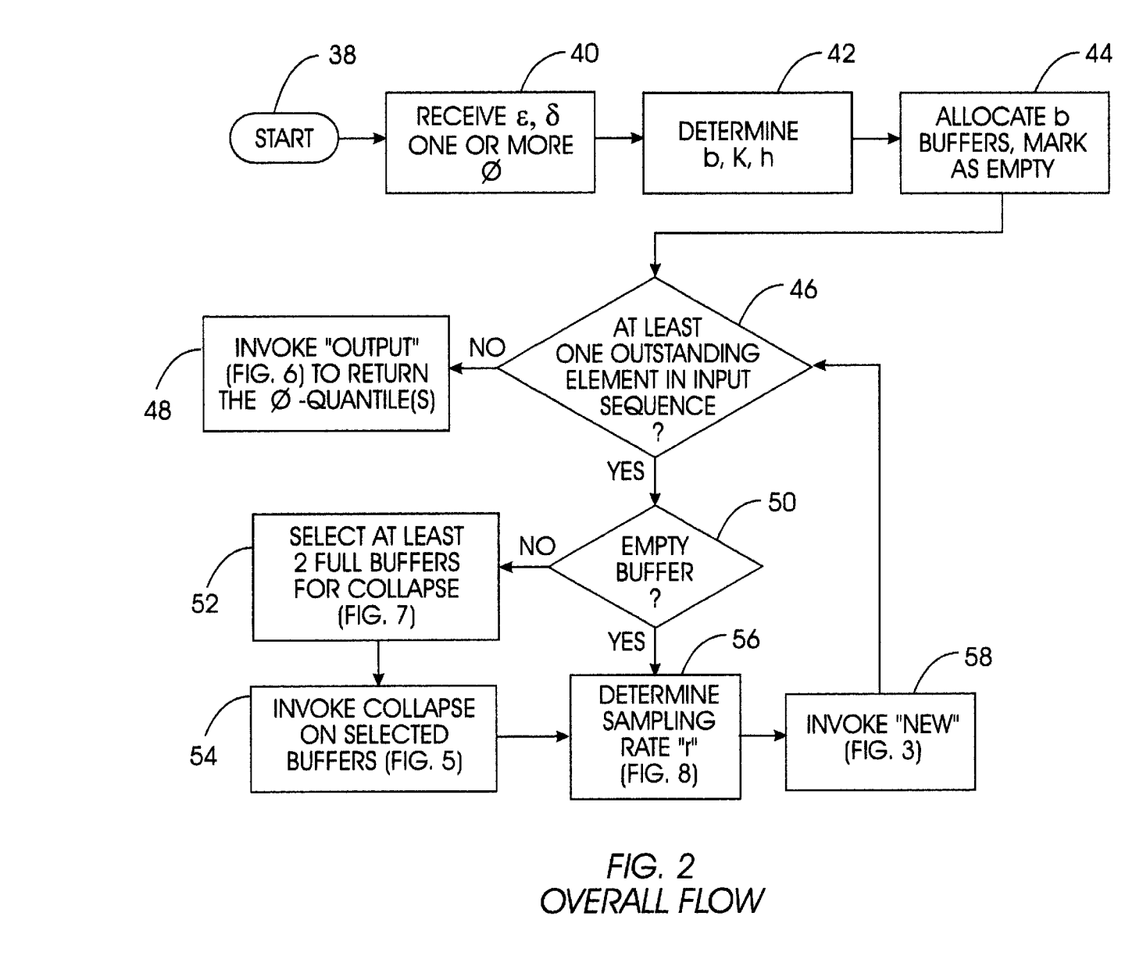
FIG. 2 is a flow chart showing the overall steps of the present logic in generating approximate quantiles in a data stream.

Now referring to FIG. 2, the overall steps for generating approximate quantiles can be seen. Commencing at start state 38, the process moves to block 40 to receive a user-desired approximate quantile $\phi$, $0<\phi<1$, and user-defined approximation error $\epsilon$, $0<\epsilon<1$, as well as a user-defined probability of failure of at most $\delta$, $0<\delta<1$ (or equivalently, a user-defined probability of success of at least $1-\delta$). The logic then moves to block 42 to determine an integer number b of buffers, each having a capacity or size k of elements, wherein k is an integer. Additionally, as indicated at block 42 a number h is also determined. The numbers b, k, and h are determined based upon the user-defined approximation error $\epsilon$ and the probability of failure $\delta$. It is to be understood that by user-defined is meant that a parameter is defined by a human user, or by a computer program such as the quantile engine 30 shown in FIG. 1. In any case, the particular parameter is defined apriori.

To determine b, k, and h, the present invention proceeds as follows. A combination of values for b, k, and h is iteratively determined that minimizes the product b*k subject to the following constraints:

k * minimum $[L_d, 8L_s/3] \geq \log(2/\delta)/[2(1-\alpha)^2\epsilon^2]$;

$h+3+c \leq 2\alpha\epsilon k$; and $h+1 \leq 2\epsilon k$, wherein c=maximum $\{[(L_d/L_s-2)(H-2)]/[(L_d/L_s)+2^H-2]\}$, where H is selected from the sequence 1, 2, . . . , until it becomes clear that increasing values of H do not maximize c, and where $h \geq 3$, $b \geq 2$, $k \geq 1$, $0<\alpha<1$, and $L_d$ and $L_s$ are combinatorial values, namely, $L_d$=number of ways to obtain h−1 elements from a set of size b+h−2, and $L_s$=number of ways to obtain h−1 elements from a set of size b+h−3. Optimal values for b and k for values of $\epsilon$ and $\delta$ that are of practical interest can be computed by searching for b and h in the interval [2, 50].

It is to be understood that b, k, and h can be precomputed for a given ranges of $\epsilon$ and $\delta$.

Based upon the determinations of b, k, and h, the logic proceeds to block 44 to allocate b buffers, each capable of holding k elements, and to mark the buffers as "empty". If desired, all b buffers can be allocated immediately, if the objective is to minimize the maximum amount of memory that will ever be required during the process. On the other hand, if the objective is that the main memory requirements be as close as possible to that were the number N of data elements known, a schedule for buffer allocation, as measured by a quantification of the "goodness" of the schedule, can be provided and followed, for dynamically allocating the buffers.

Still another approach to dynamic buffer allocation is to allow a user to specify an upper limit on main memory requirements for different values of N. By trial and error, the user can discover a buffer allocation schedule that is both valid and reasonably good for dynamically allocating buffers over a period of time or process. In this last approach, k and b are searched for using increasingly large values of k. It will readily be appreciated that fixing k in turn fixes b and, thus, the buffer allocation schedule. Then, using the equation $h+1 \leq 2\epsilon k$, the value for h can be limited to limit the height to which the below-described tree grows before the below-described sampling is commenced. Using the above equations, $L_d$ and $L_s$ and upper and lower bounds for a can be computed. If the range between these bounds does not intersect with the interval (0,1), the current schedule (i.e., the current values for k, b, and h) are rejected and then a larger value for k is selected and the above process repeated until all constraints have been satisfied and the current schedule thus found to be acceptable. Like b, k, and h, the buffer allocation can be precomputed for ranges of $\epsilon$ and $\delta$.

Moving to decision diamond 46, the logic next determines whether at least one outstanding element in the input sequence remains to be processed. If not, the logic moves to block 48 to invoke the below-described "output" operation (shown in FIG. 6), wherein an element in a final output buffer is output as the approximate $\phi$-quantile being sought.

On the other hand, if it is determined at decision diamond 46 that additional unprocessed data elements remain in the input stream, the logic moves to decision diamond 50 to determine whether at least one input buffer is at least partially empty. If no buffer is not at least partially empty, the logic moves to block 52. As indicated, at block 52 at least two of the full input buffers are selected in accordance with the logic described below in reference to FIG. 7 for a "collapse" operation. This "collapse" operation is executed at block 54 in accordance with logic shown and described below in reference to FIG. 5 to collapse input buffers into one or more output buffers. Thus, the "collapse" operation results in a subset of elements in the input buffers being stored in the output buffer.

From block 54, or from decision diamond 50 if it is determined that an empty input buffer exists, the logic moves to block 56 to determine a sampling rate r in accordance with the logic shown in FIG. 8 and set forth more fully below. After determining the sampling rate r, the logic proceeds to block 58 to invoke the "new" operation shown in FIG. 3, wherein empty buffers are filled with elements from the data stream. The logic then loops back to decision diamond 46 as shown.

Figure 3:
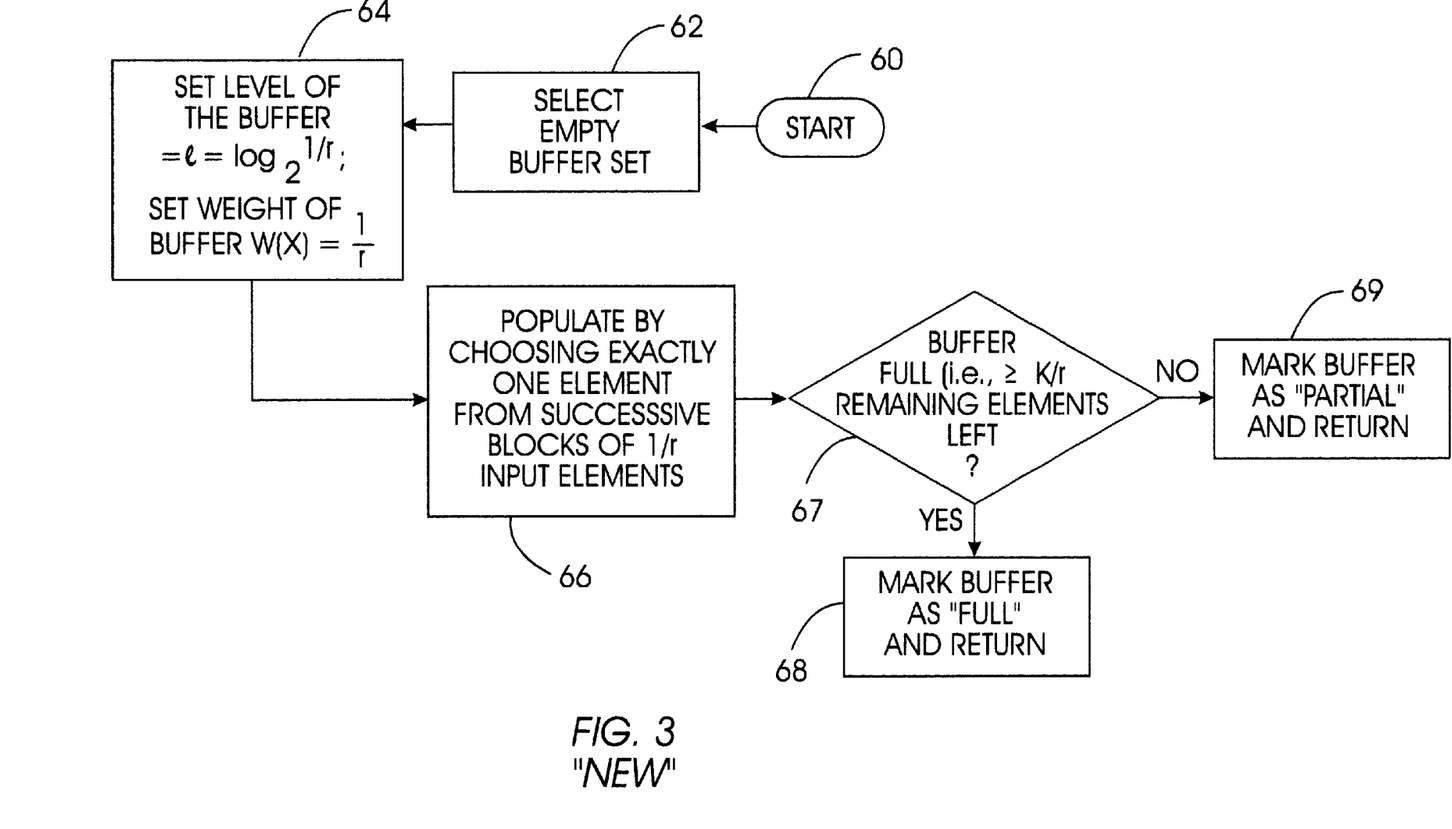
FIG. 3 is a flow chart showing the "new" operation for filling empty buffers.

FIG. 3 shows the "new" operation mentioned above. Commencing at start state 60, the logic moves to block 62 to select an empty buffer. Proceeding to block 64, the level l of the input buffer is set equal to $\log_2(1/r)$ as established at block 56 in FIG. 2. Moving to block 66, the input buffer is populated by randomly choosing one element from successive blocks of 1/r input elements and inserting the elements into the input buffer. Next, at decision diamond 67 it is determined whether the buffer is full, i.e., whether at least k/r data elements were in the input stream prior to filling the buffer. If the buffer is full the logic marks the buffer as such at block 68 and returns the buffer. Otherwise, the buffer is marked as "partially full" and returned at block 69. The weight of a new buffer initially equals 1/r, and this weight is established at block 64. All input buffers are populated in this way as they are allocated, dynamically or otherwise.

Figure 4:
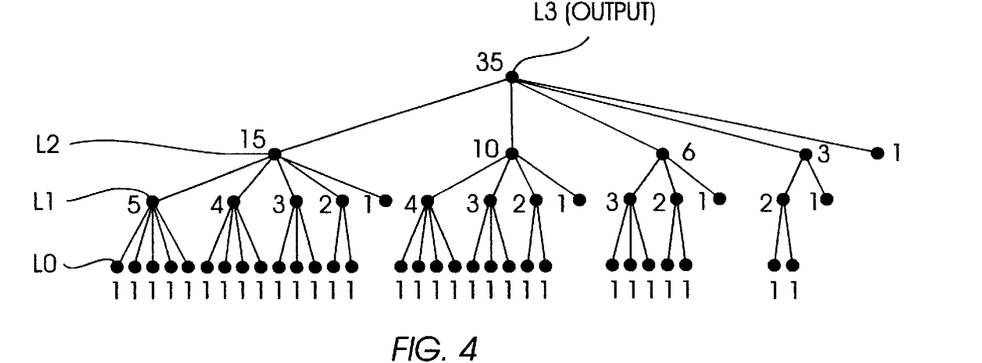
FIG. 4 is a schematic representation of a data tree illustrating the logical buffers of the present invention.
Figure 5:
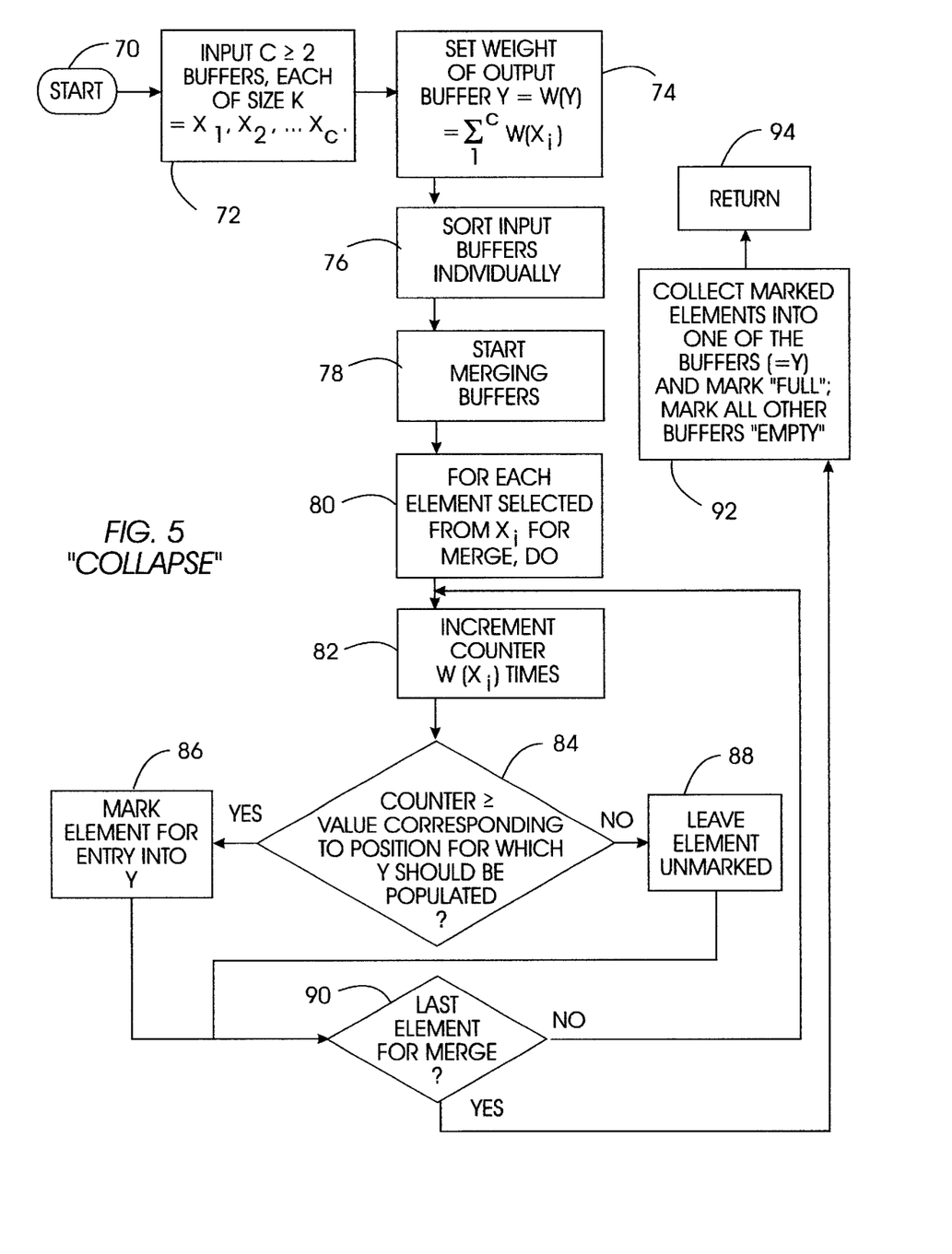
FIG. 5 is a flow chart showing the "collapse" operation for collapsing full buffers.

FIGS. 4 and 5 illustrate the "collapse" operation, it being understood that FIG. 4 represents a data tree for a particularly preferred "collapse" operation and FIG. 5 represents the logic of a more generalized "collapse" operation. As shown in FIG. 4, the sequence of operations set forth below can be represented by the data tree shown, with the vertex set of the tree (except the root) being the set of all logical buffers produced during the computation. It is to be understood that the tree shown in FIG. 4 represents logical buffers, and not physical buffers, as will become clearer after subsequent disclosure.

FIG. 4 labels each buffer with its weight, which is proportional to the number of data elements represented by the buffer. The leaves of the tree, denoted as having weights of 1, correspond to the initial buffers that are populated with the input data stream. An edge is drawn as shown from each input buffer to the output buffer of a "collapse" operation.

In the example shown, the input buffers for the first collapse are all at level 0, and the output buffers for the first collapse are at level 1. These buffers, along with additional leaf buffers as shown, serve as input buffers for buffers at level 2 during the next successive "collapse". In turn, buffers at level 2, including some leaf buffers, serve as input buffers for the root, labelled at level 3, it being understood that the root corresponds to the "output" operation and may not necessarily be a buffer itself. For reference, the tree shown in FIG. 4 represents three levels of collapse operations, and thus has a height "h" of four.

With the above data tree in mind, reference is now made to FIG. 5 in understanding the "collapse" operation. In the preferred embodiment, the "collapse" operation receives $c \geq 2$ input buffers $X_1, X_2, \ldots, X_c$ and outputs a buffer, Y, all of size k. At the end of a "collapse" operation, all but one input buffer is marked empty, with the output buffer Y being the buffer that is marked full. Thus, Y is logically different than $X_1, X_2, \ldots, X_c$ but physically occupies space corresponding to one of them.

Commencing at start state 70, the logic moves to block 72, wherein an integer number c of input buffers $X_1, X_2, \ldots, X_c$, each of size k elements, is input, wherein $c \geq 2$. Then, moving to block 74 the weight w(Y) of a logical output buffer Y is established to be the sum of the weights $w(X_i)$ of the input buffers X.

Proceeding to block 76, the elements in each input buffer $X_i$ are sorted, that is, the input buffers $X_i$ are sorted individually. Then, at block 78 the logic begins to merge the input buffers. To conserve space, the collapsing of input buffers into an output buffer commences as soon as the merging step at block 78 commences.

This is illustrated at block 80, which is the beginning step of a logical loop that is serially undertaken for each data element selected for merging from each input buffer $X_i$. Moving to block 82, a counter, initialized at zero, is incremented $w(X_i)$ times. At decision diamond 82 it is determined whether the value of the counter is at least equal to a value corresponding to a position for which the output buffer Y should be populated.

The values corresponding to positions for which the output buffer Y should be populated are determined as follows. In accordance with the present invention, the elements in the output buffer Y are k equally spaced elements in the sorted sequence of data elements from the input buffers $X_1, X_2, \ldots, X_c$. When the weight w(Y) of the output buffer Y is odd, these k elements (i.e., the positions for which Y should be populated) are in positions $jw(Y)+\{w(Y)+1\}/2$ for $j=0,1,\ldots,k-1$. On the other hand, when the weight w(Y) of the output buffer Y is even, these k elements can be in positions $jw(Y)+w(Y)/2$ or in $jw(Y)+\{w(Y)+2\}/2$ for $j=0, 1,\ldots,k-1$. In the present invention, the "collapse" operation alternates between these two choices on successive invocations with even output buffer weight w(Y).

When the test at decision diamond 82 is positive, the element is marked for entry into the output buffer Y at block 86. Otherwise, the element is left unmarked at block 88.

From block 86 or 88 the logic moves to decision diamond 90 to determine whether the last element in the input buffers $X_1, X_2, \ldots, X_c$ has been merged. If not, the logic loops back to block 82 for the next element. On the other hand, when all input elements have been merged, the logic moves to block 92 to collect all marked elements into one of the buffers, which is designated to be the output buffer Y, and this buffer is marked "full". All other buffers involved in the "collapse" operation just described are marked empty, and are then returned, at block 94, to the "new" operation. As can be appreciated in reference to the above discussion and FIG. 4, the output buffer Y can be used as a full input buffer to the next successive "collapse" operation.

Figure 6:
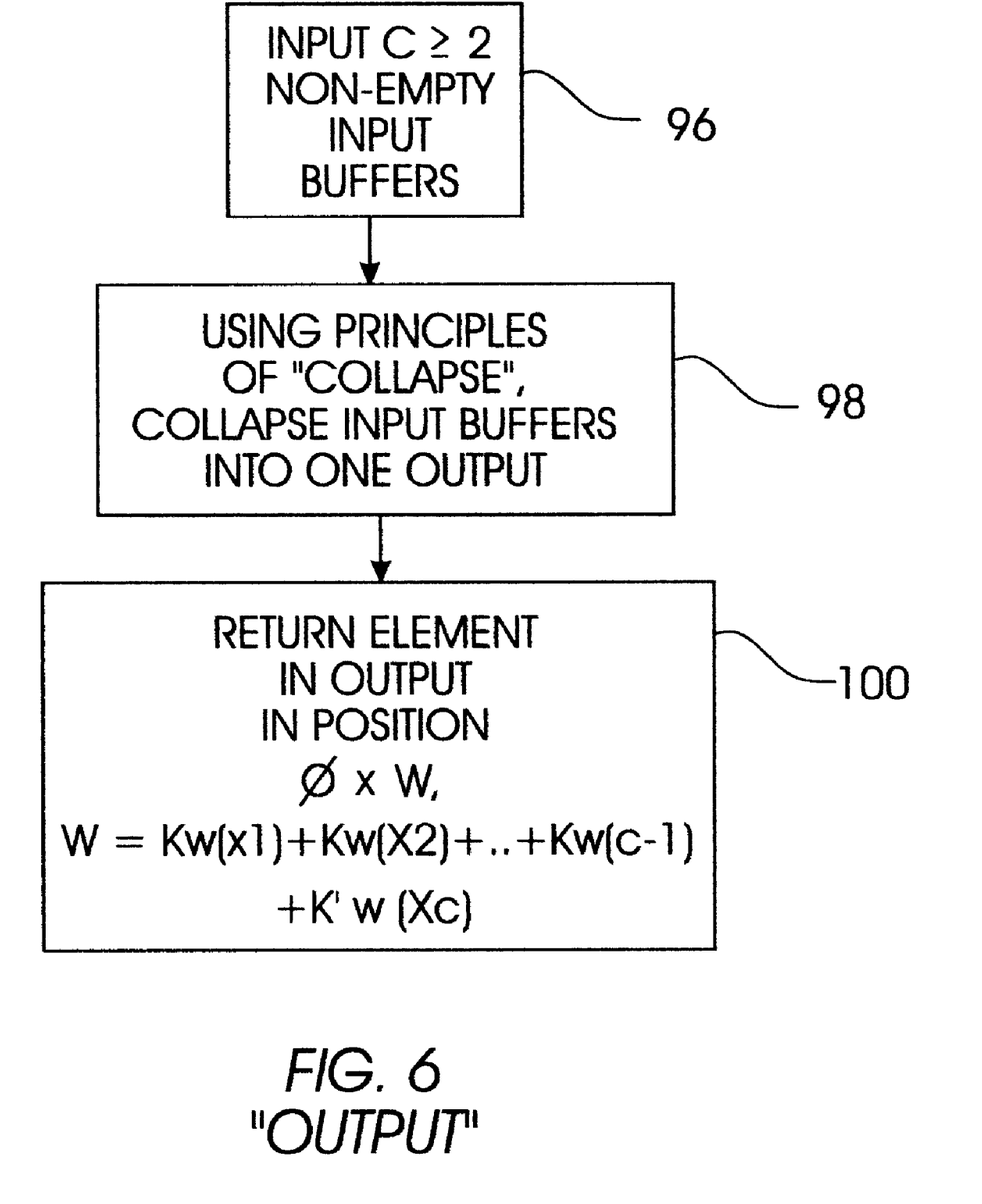
FIG. 6 is a flow chart showing the "output" operation for outputting a final output buffer with approximate quantile.

FIG. 6 shows the "output" operation. At block 96, an integer number $c \geq 2$ of non-empty input buffers is input, and then at block 98 the input buffers are collapsed into a single output sequence of data elements using the "collapse" operation described above. The output sequence need not itself be a buffer. Then, at block 100 the element in position $\phi*W$ in the output sequence is returned as the approximate quantile being sought, wherein W is the sum of the weights $kw(X_1)+kw(X_2)+\ldots+kw(X_{c-1})+k'w(X_c)$ of the buffers that were input to the "output" operation. It is to be understood that the last element in the above-described sequence represents a partially full buffer (if one exists), and that k', $1 \leq k' \leq k$, represents the number of elements in the partially full buffer.

Figure 7:
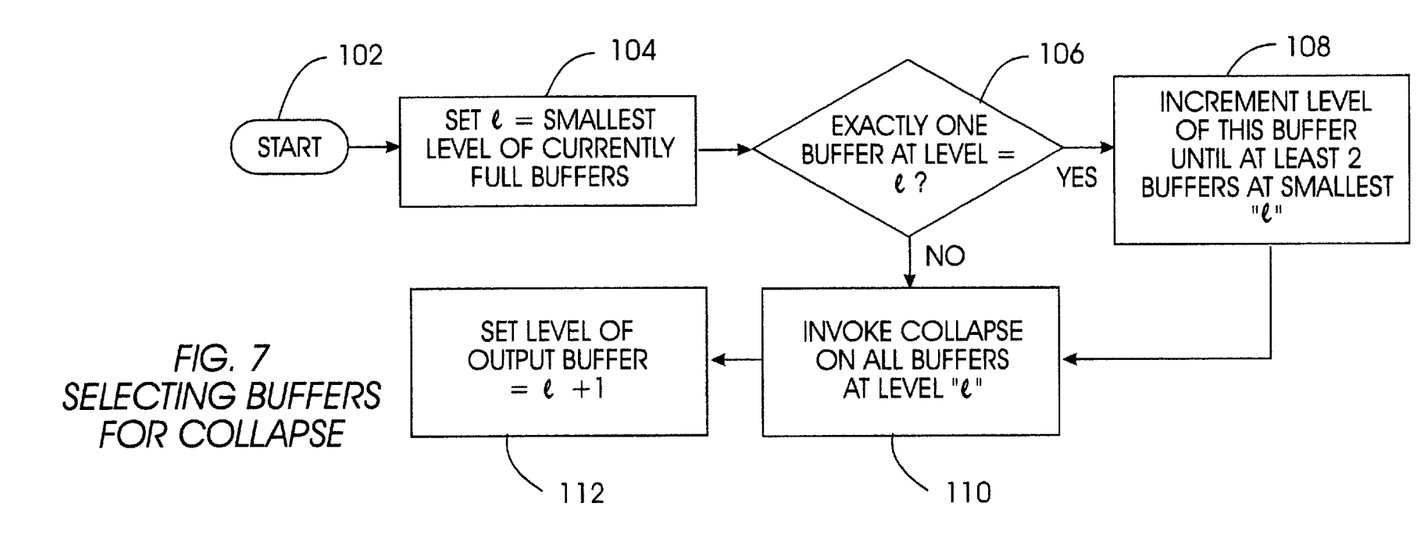
FIG. 7 is a flow chart showing a specific policy for selecting buffers for the "collapse" operation.

Recalling the data tree shown in FIG. 4 and now referring to FIG. 7, a particularly preferred policy for selecting buffers for "collapse" is shown. Commencing at start state 102, the logic moves to block 104 to set a variable l equal to the lowest level of currently full buffers.

Moving to decision diamond 106, the logic determines whether exactly one buffer at level l exists. If so, the logic proceeds to block 108 to increment the level of the buffer until at least two buffers exist at the smallest (after incrementing) level l. As an example, if only one buffer exists at level 1, none exist at level 2, and 1 exists at level 3, the level l initially equals one and the incrementing step at block 108 raises it past 2 (since no buffers exist at level 2 in this example) to level 3. Accordingly, in this example l=3 after the step at block 108.

From block 108 or from decision diamond 106 if it was determined that more than one empty buffer existed at the then-level l, the process moves to block 110 to invoke the above-described collapse operation on all buffers at the $l^{th}$ level of the logical data tree exemplified in FIG. 4. Then, at block 112 the level of the resulting output buffer is set equal to l+1.

Figure 8:
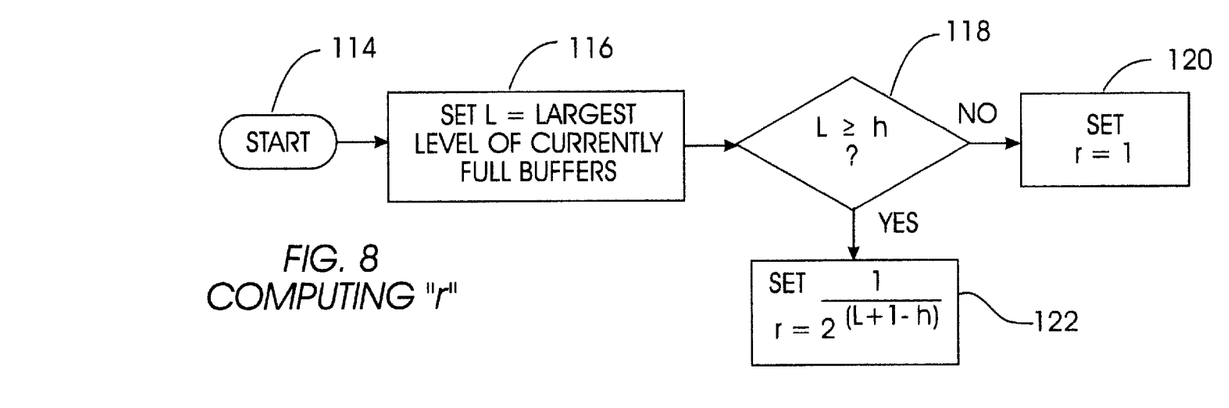
FIG. 8 is a flow chart showing the steps for determining the sampling rate "r"

FIG. 8 shows the method for determining the sampling rate r. Commencing at state 114, the logic moves to block 116 to set L=largest level of currently full buffers. Moving to decision diamond 118 it is determined whether L is at least as great as h, and if not, r is set equal to unity at block 120. Otherwise, r is set equal to $1/(2^{L+1-h})$ at block 122. With this in mind, it is to be appreciated that the sampling described above is non-uniform, in that elements that appear later in the input sequence are sampled at a lower frequency than elements that appear early in the sequence.

Figure 9:
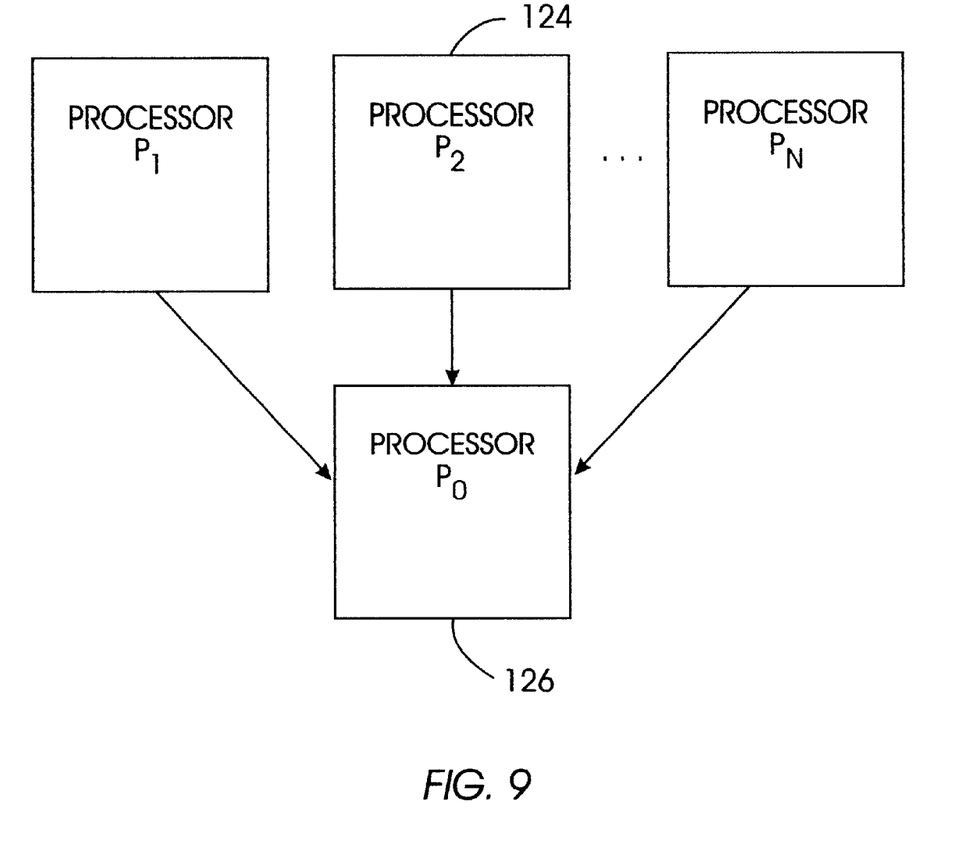
FIGS. 9 and 10 are system and logic diagrams of a parallel system.
Figure 10:
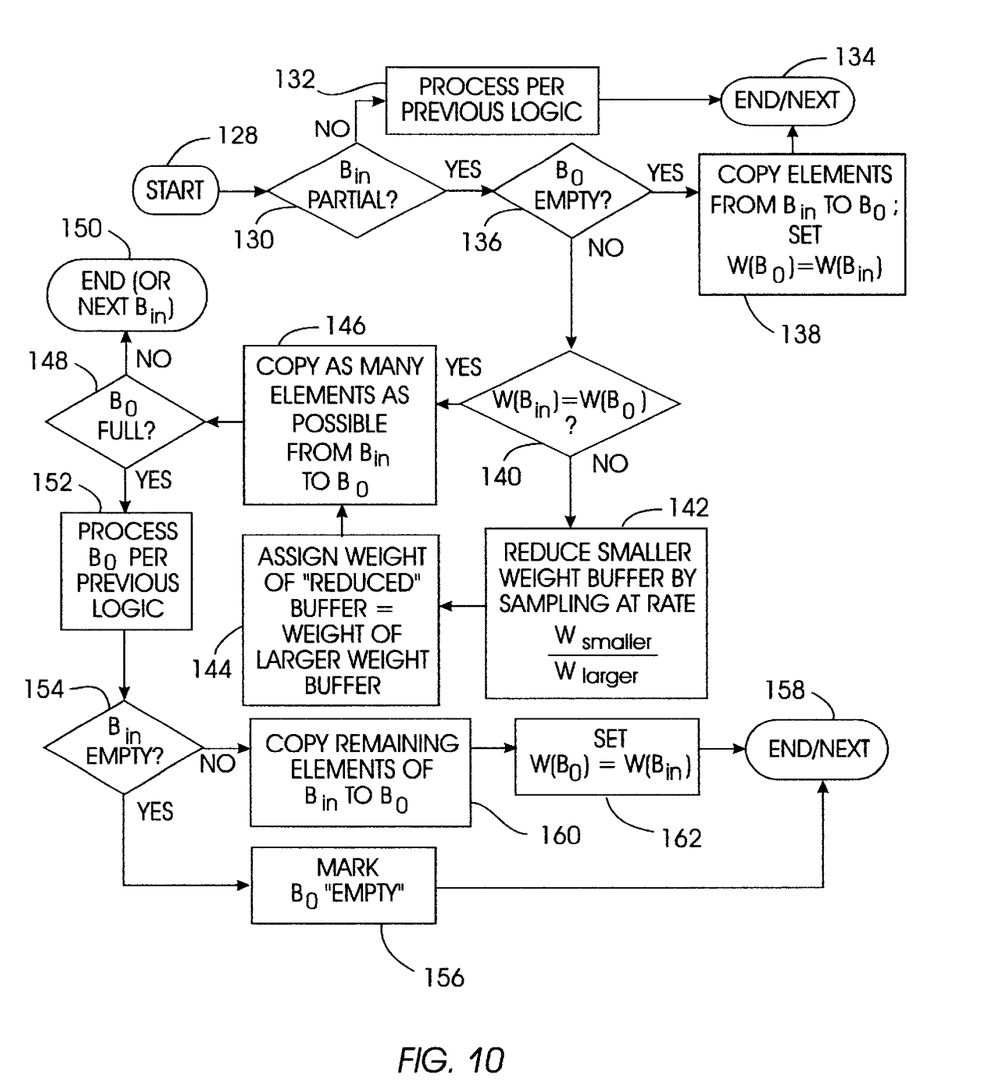

FIGS. 9 and 10 show that $P_1-P_N$ processors 124 can process respective sequences of the data elements up to the "output" step and send respective output buffers to a distinguished processor $P_0$ 126, which determines approximate quantiles for the aggregate of all sequences taken together without knowing the size of the input data set. At each processor $P_1$-$P_N$ 124 the above logic is executed until that processor's input sequence has been completely processed, at which time the processor executes a final "collapse" operation on the remaining full buffers to output at most one full buffer and at most one partially full buffer to the distinguished processor $P_0$. Both buffers are tagged with their respective weights and sizes prior to being sent to the distinguished processor $P_0$.

FIG. 10 shows the logic executed by the distinguished processor $P_0$. Commencing at start state 128 for each input buffer $B_{in}$, the logic proceeds to decision diamond 130 to determine whether the input buffer is a partially full buffer. If it is a full buffer, the logic moves to block 132 to process the buffer per previously disclosed logic, and then ends at state 134 for the current input buffer, it being understood that the next input buffer can be fetched and processed starting at state 128.

In contrast, if the input buffer is only partially full, the logic moves from decision diamond 130 to decision diamond 136, wherein it is determined whether a working buffer $B_0$ is empty. If it is, the logic proceeds to block 138 to copy elements from the input buffer into the working buffer, and to set the weight $w(B_0)$ of the working buffer equal to the weight $w(B_{in})$ of the input buffer. The logic then moves to state 134.

If, on the other hand, the input buffer is only partially full and the working buffer is not empty, the logic moves to decision diamond 140. At decision diamond 140, the logic determines whether the weight of the partially full input buffer equals the weight of the working buffer. If the weights aren't equal, the smaller weight buffer is reduced at block 142 by sampling it at a rate equal to the ratio of the smaller weight to the larger. From block 142, the logic moves to block 144 to assign the reduced buffer the weight of the larger weight buffer.

From block 144, or from decision diamond 140 if the weights of the two buffers are equal, the logic proceeds to block 146. At block 146, the logic copies as many elements as possible from the partially full input buffer into the working buffer. Continuing to decision diamond 148, it is determined whether the working buffer is full as a result of the step at block 14655, and if it is not, the logic ends at state 150. Otherwise, the logic proceeds to block 152 to process the full working buffer per previous disclosure.

Continuing with the description of FIG. 10, the process moves from block 152 to decision diamond 154 to determine whether the input buffer is empty. If it is, the working buffer is marked as being empty at block 156, and the logic ends at state 158. On the other hand, if it is determined at decision diamond 154 that the input buffer is not empty, the logic moves to block 160. The remaining elements in the input buffer $B_{in}$ are copied to the working buffer $B_0$ at block 160. Then, at block 162 the weight of the working buffer is set equal to the weight of the input buffer as it existed prior to the copying step at block 160. The process then ends at state 158.

For parallel sampling, "b" and "k" are determined to optimize the product "bk" subject to the following constraints:

$\min[L_d k, 8L_s k/3] \geq (\log(2\delta_{-1}))/(2(1-\alpha)^2 \epsilon^2);$ $h+h'+3+c \leq 2\alpha\epsilon k;$ and $h+h'+1 \leq 2\epsilon k$, wherein h' is the increase in the height of the tree at the distinguished processor $P_0$ vis-a-vis the tree heights "h" at the processors $P_1$-$P_N$.

As understood by the present invention, when the degree of parallelism is very large, collecting output buffers at a single distinguished processor may cause deteriorated performance. In such a case, processors can be aggregated into multiple groups. One designated "intermediate distinguished" processor in each group collects and processes the output buffers from the other processors in its group in accordance with above principles, and the intermediate distinguished processors output their buffers to a final distinguished processor. Under such circumstances, the increase h' in the height of the tree built by the final processor is used to determine "b" and "k".

While the particular SINGLE PASS SPACE EFFICIENT SYSTEM AND METHOD FOR GENERATING AN APPROXIMATE QUANTILE IN A DATA SET HAVING AN UNKNOWN SIZE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

We claim:

1. A computer system, comprising:

a general purpose computer;

one or more input devices associated with the computer for generating a user specification, the specification establishing at least one desired approximate φ-quantile, a quantile approximation error $\epsilon$, and a probability of failure $\delta$, wherein the approximate φ-quantile is guaranteed to represent a true quantile of a data set and lie within the quantile approximation error $\epsilon$ with a probability of at least 1−δ;

a data set having a size, the size being unavailable to the computer in advance; and computer usable code means executable by the computer for determining a φ-quantile data element in the data set, the computer usable code means having:

means for determining a number b of buffers and a size k of each buffer, and a number h, based at least in part on the permissible approximation error $\epsilon$ and the probability of failure $\delta$;

means for filling empty buffers with data elements to establish a plurality of input buffers;

means for collapsing data elements in input buffers into at least one output buffer; and means for outputting, from an output buffer, at least one φ-quantile data element.

2. The system of claim 1, further comprising means for sampling the data set based at least in part on the number h to establish sampled data elements for populating buffers, wherein the means for sampling determines a sampling rate r based at least in part on the number h.

3. The system of claim 1, wherein the means for collapsing can be represented by a data tree defining an integer number of levels, and the system further includes:

means for establishing a level integer l to be the lowest level of full buffers in the data tree;

means for invoking the means for filling when one or more empty buffers exist, the means for invoking incrementing the level integer l by unity at least n times, n≥1, when exactly one empty buffer exists, and otherwise not incrementing the level integer l, the means for invoking associating each empty buffer with the level integer l; and means for invoking the means for collapsing to collapse buffers at level l when no empty buffers exist, the output buffer being associated with the integer l+1.

4. The system of claim 3, further comprising means for sampling the data set to establish sampled data elements for populating buffers, the means for sampling determining a sampling rate r based at least in part on the number h, the means for sampling setting the sampling rate r equal to unity when an integer L representing a highest level at which a buffer exists is less than the number h, and otherwise setting the sampling rate r equal to $\frac{1}{2}^{L+1-h}$, whereby the means for sampling samples the data set at least part of the time non-uniformly.

5. The system of claim 1, wherein the computer usable code means dynamically allocates the input buffers.

6. The system of claim 1, wherein an output buffer is used as an input buffer for a successive collapsing operation, and wherein the means for collapsing is invoked when all buffers contain k data elements.

7. The system of claim 1, wherein the means for collapsing includes:

means for sorting data in at least some input buffers, each input buffer defining a respective weight $w_i$, representative of the number of data elements represented by each element of the input buffer means for selecting sorted data elements from the input buffers for merging;

means for incrementing a counter $w_i$ times in response to the means for selecting; and means for designating an element from an $i^{th}$ input buffer as an output buffer element when the counter is at least as large as a predetermined value.

8. The system of claim 7, wherein the means for collapsing further includes:

means for collecting elements designated as output buffer elements into an output buffer;

means for designating the input buffers as empty;

means for designating the output buffer as a full input buffer; and means for then reinvoking the means for filling to fill with data elements input buffers;

designated as empty, the full input buffer being usable as an input buffer by the means for collapsing.

9. The system of claim 1, wherein the means for filling includes:

means for invoking the means for outputting when less than k elements remain in the input data set and at least one buffer is empty, and otherwise invoking the means for collapsing.

10. The system of claim 1, wherein the means for determining minimizes the product b*k subject to at least one constraint, the constraint being a function at least of the permissible approximation error $\epsilon$ and the probability of failure $\delta$.

11. The system of claim 1, wherein the computer usable code means is implemented in a database management system.

12. For an input data set having at least one true $\phi$-quantile data element, a computer-implemented method for generating, in a single pass over the input data set without knowledge of the size of the data set, one or more approximate $\phi$-quantile data elements respectively representative of the true $\phi$-quantile data elements, the approximate $\phi$-quantile data elements differing from the respective true $\phi$-quantile data elements by no more than a user-defined approximation error $\epsilon$ with a probability of 1—(a user defined probability of failure $\delta$), the method comprising the acts of:

establishing b buffers having capacities to hold k data elements, b and k being integers related to the approximation error $\epsilon$ and the probability of failure $\delta$; and alternately filling empty buffers with elements from the data set to establish input buffers and then storing only a subset of the elements in the input buffers into one or more output buffers until the entire input data set is processed, at least one of the elements being output as the approximate $\phi$-quantile.

13. The method of claim 12, further comprising sampling the data set non-uniformly to select data elements for populating the buffers during the filling act.

14. The method of claim 12, wherein the buffers are dynamically allocated for filling.

15. The method of claim 13, further comprising:

determining a number h based at least in part on the permissible approximation error $\epsilon$ and the probability of failure $\delta$; and determining a sampling rate r based at least in part on the number h, the sampling rate r being used for sampling the data set.

16. The method of claim 15, wherein the buffers can be represented by a data tree defining an integer number of levels, and the method further includes:

establishing a level integer l to be the lowest level of full buffers in the data tree;

incrementing the level integer l by unity at least n times n≧1, when exactly one empty buffer exists, and otherwise not incrementing the level integer l; associating each empty buffer with the level integer l; and collapsing buffers at level l when no empty buffers exist, the output buffer being associated with the integer l+1.

17. The method of claim 16, comprising setting the sampling rate r equal to unity when an integer L representing a highest buffer level is less than the number h, and otherwise setting the sampling rate r equal to $\frac{1}{2}^{L+1-h}$, whereby the data set is sampled at least part of the time non-uniformly.

18. The method of claim 12, wherein the storing act is accomplished by collapsing input buffers into at least one output buffer, the method further including the act of outputting at least one $\phi$-quantile data element in a final output based on a desired approximate $\phi$-quantile.

19. The method of claim 18, wherein the output buffer can be used as an input buffer for a successive collapsing operation, and wherein input buffers are collapsed when all input buffers, contain k data elements.

20. The method of claim 18, wherein the collapsing act includes:

sorting data in at least some input buffers, each input buffer defining a respective weight $w_i$, representative of the number of data elements represented by each element of the winput buffer;

serially selecting sorted data elements from the input buffers for merging;

incrementing a counter $w_i$ times in response to each serial selecting act; and designating an element from an $i^{th}$ input buffer as an output buffer element when the counter is at least as large as a predetermined value.

21. The method of claim 20, wherein the collapsing act further includes:

collecting elements designated as output buffer elements into an output buffer;

designating the input buffers as empty;

designating the output buffer as a full input buffer; and repeating the filling act to fill with data elements input buffers designated as empty, the full input buffer being usable as an input buffer for successive collapsing acts.

22. The method of claim 12, wherein the numbers b and k are established by minimizing the product b*k subject to at least one constraint, the constraint being a function of the permissible approximation error $\epsilon$ and the probability of failure $\delta$.

23. The method of claim 12, wherein the approximate $\phi$-quantile data element is guaranteed to represent a true $\phi$-quantile of the data set and lie within the quantile approximation error $\epsilon$ with a probability of at least $1-\delta$.

24. The method of claim 12, wherein the method is implemented in a database management method.

25. A computer program device comprising:

a computer program storage device readable by a digital processing apparatus; and a program on the program storage device and including instructions executable by the digital processing apparatus for performing method acts for determining at least one desired approximate $\phi$-quantile data element for elements in a data set within at least one user-defined approximation error with a probability of at least $1-\delta$ the acts being undertaken without using a size of the data set, the acts executed by the instructions comprising:

filling at most b empty buffers with at most k elements in the input data set to establish at least some input buffers, b and k being related to the approximation error $\epsilon$ and to a probability of failure $\delta$, b and k being unrelated to the size of the data set;

storing a subset of the elements in the input buffers in at least one output buffer; and identifying an element in a final output based on the desired approximate $\phi$-quantile data element.

26. The computer program device of claim 25, wherein the filling act undertaken by the program includes sampling the data set at least partially non-uniformly.

27. The computer program device of claim 25, wherein the filling act undertaken by the program includes dynamically allocating buffers for filling.

28. The computer program device of claim 25, wherein the storing act undertaken by the program includes collapsing input buffers into at least one output buffer, and wherein the filling and collapsing acts are alternatingly undertaken by the program.

29. The computer program device of claim 28, wherein the output buffer can be used as an input buffer for a successive collapsing act, and wherein the collapsing act is invoked by the program when all buffers contain k data elements.

30. The computer program device of claim 28, wherein the collapsing act undertaken by the program includes:

sorting data in at least some input buffers, each input buffer defining a respective weight $w_i$ representative of the number of data elements represented by the input buffer;

selecting sorted data elements from the input buffers for merging;

incrementing a counter $w_i$ times in response to at least a portion of the selecting act; and designating an element from an $i^{th}$ input buffer as an output buffer element when the counter is at least as large as a predetermined value.

31. The computer program device of claim 30, wherein the collapsing act undertaken by the program further includes:

collecting elements designated as output buffer elements into an output buffer;

designating the input buffers as empty;

designating the output buffer as a full input buffer; then reinvoking the filling act to fill with data elements input buffers designated as empty, the full input buffer being usable as an input buffer by the collapsing act.

32. The computer program device of claim 25, wherein the filling act undertaken by the program includes:

outputting a quantile element when less than k elements remain in the input data set and at least one buffer is empty.

33. The computer program device of claim 28, wherein the collapsing act undertaken by the program can be represented by a data tree defining an integer number levels.

34. The computer program device of claim 33, wherein the acts undertaken by the program further comprise:

establishing a level integer l to be the lowest level of full buffers in the data tree;

incrementing the level integer l by unity at least n times, $n \geq 1$, when exactly one empty buffer exists, and otherwise not incrementing the level integer l;

associating each empty buffer with the level integer l; and collapsing buffers at level l when no empty buffers exist, the output buffer being associated with the integer l+1.

35. The computer program device of claim 34, wherein the acts undertaken by the program further comprise:

determining a number h based at least in part on the permissible approximation error $\epsilon$ and the probability of failure $\delta$; and setting a sampling rate r equal to unity when a highest buffer level L is less than the number h, and otherwise setting the sampling rate r equal to $\frac{1}{2}^{L+1-h}$, wherein the sampling rate r is used for sampling the data set.

36. The computer program device of claim 25, wherein the program further undertakes the act of minimizing the product b*k subject to at least one constraint, the constraint being a function of the permissible approximation error $\epsilon$ and the number N of elements in the input data set.

37. The computer program device of claim 25, wherein the program are implemented in a database management system.

38. A method for determining at least one approximate quantile of a number of elements in a data set in a single pass over the elements while minimizing memory usage and meeting a desired approximation guarantee with a given probability without knowing the number of elements, comprising the acts of:

receiving the elements;

using sampled elements to fill input buffers, the number and size of the buffers depending at least on the approximation guarantee but not on the number of elements in the data set; and outputting the approximate quantile such that the approximate quantile meets the approximation guarantee with the given probability.

39. The method of claim 38, further comprising the acts of:

sampling at least some of the elements non-uniformly;

collapsing the buffers when all buffers are in a full state; and repeating the loading, sorting, and collapsing acts until the data set is in an empty state.

40. The system of claim 1, wherein the data elements used by the general purpose computer are received in buffers from other computers executing in parallel.

41. The method of claim 12, further comprising the act of receiving data elements from plural computers executing in parallel.

42. The device of claim 25, wherein the acts executed by the instructions comprise receiving data elements in buffers from plural computers executing in parallel.

43. The method of claim 38, wherein the elements are received in buffers from computers executing in parallel.

44. A computer system, comprising:

a general purpose computer;

one or more input devices associated with the computer for generating a user specification, the specification establishing at least one desired approximate φ-quantile, a quantile approximation error ε, and a probability of failure δ, wherein the approximate φ-quantile is guaranteed to represent a true quantile of a data set and lie within the quantile approximation error ε with a probability of at least 1−α;

a data set; and computer usable code means executable by the computer for determining a φ-quantile data element in the data set, the computer usable code means having:

means for precomputing a number b of buffers and a size k of each buffer, and a number h, based at least in part on the permissible approximation error ε and the probability failure δ, b buffers then being preallocated;

means for, after the precomputing and preallocating steps, filling empty buffers with data elements to establish a plurality of input buffers;

means for collapsing data elements in input buffers into at least one output buffer; and means for outputting, from an output buffer, at least one φ-quantile data element.

45. The system of claim 1, wherein b, k, and h are precomputed and b buffers are preallocated.

46. The method of claim, 12, further comprising the act of precomputing at least b and k and preestablishing the b buffers.

47. The device of claim 25, wherein the acts executed by the instructions comprise precomputing at least b and k and preallocating the b buffers.

48. The method of claim 38, wherein the number and size of the buffers are precomputecd.

* * * * *